Dec. 30, 1969   H. ZIRNGIBL ET AL   3,486,913
PROCESS FOR THE PRODUCTION OF FINELY DIVIDED
OXIDES FROM HALIDES
Filed April 11, 1968   2 Sheets-Sheet 1

INVENTORS
HANS ZIRNGIBL, WALTER GUTSCHE, KARL BRÄNDLE,
BY
Burgess, Dinklage & Sprung
ATTORNEYS

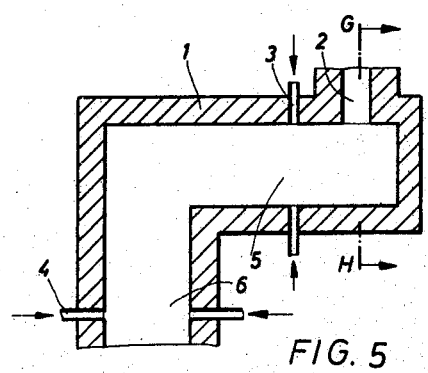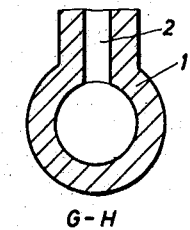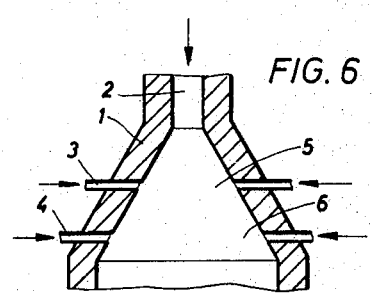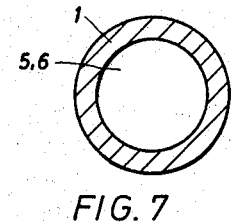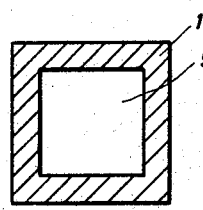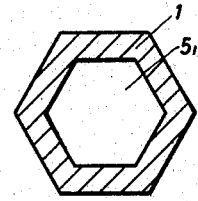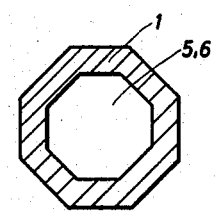

United States Patent Office 3,486,913
Patented Dec. 30, 1969

3,486,913
PROCESS FOR THE PRODUCTION OF FINELY DIVIDED OXIDES FROM HALIDES
Hans Zirngibl, Duisburg, and Walter Gutsche and Karl Brandle, Krefeld, Germany, assignors to Farbenfabriken Bayer Aktiengesellschaft, Leverkusen, Germany, a corporation of Germany
Filed Apr. 11, 1968, Ser. No. 720,615
Claims priority, application Germany, Apr. 13, 1967, F 52,114
Int. Cl. C01b 33/12; C01f 7/02; C08h 17/24
C09c 1/00
U.S. Cl. 106—288                                              8 Claims

ABSTRACT OF THE DISCLOSURE

Production of finely divided inorganic oxides, e.g. of Ti, Cr, Si, Al, Zr, Fe, Zn, Sn, etc., and mixtures thereof, by introducing separately into a reaction zone the corresponding volatilized inorganic halide component, preferably the chloride e.g. $TiCl_4$, $CrCl_3$, $CrO_2Cl_2$, $SiCl_4$, $AlCl_3$, $ZrCl_4$, $FeCl_2$, $FeCl_3$, $ZnCl_2$, $SnCl_4$, etc. and mixtures thereof, and preheated oxidant therefor, e.g. an oxygen-containing gas such as oxygen, air and/or steam, with optional introduction of a preheated inert gas, e.g. $CO_2$, $N_2$, optionally admixed with one or separately with both of said halide and oxidant components at said preheating temperature, mixing such halide and oxidant components, optionally containing said inert gas component, in said zone, e.g. in cross-flow under an impulse ratio of from more than 1 up to 50 and in a molar ratio of oxygen to halide of 1–1.5:1 using a halide concentration of about 20–45% by volume, the preheating temperatures of the halide, the oxidant, the inert gas or the inert gas halide or oxidant admixture being adjusted to a temperature just below 2000° C. prior to introducing said components into the reaction zone, the preheating temperatures being selected with respect to each other so as to obtain upon said mixing a resultant gaseous mixture having a theoretical mixing temperature substantially between about 800–1200° C., thereby effecting reaction in said zone at an elevated temperature correspondingly above said theoretical mixing temperature and substantially between about 900 to 1600° C. to form such finely divided inorganic oxide while avoiding in said zone local overheating of the finely divided oxide being formed.

---

Figure 1:
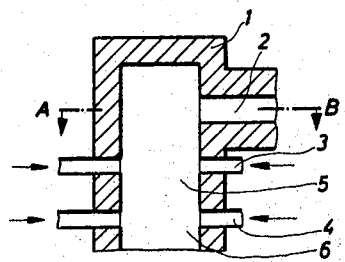

Process for the production of finely divided oxides from halides

It is known that the combustion, i.e. flame hydrolysis, of halides, preferably chlorides, can be carried out by preheating an inert gas or one of the reactants to beyond the reaction temperature either by an exothermic combustion reaction, preferably involving CO, or by electric means, usually electric arcs. In cases where arcs are used, which have the advantage of being simple and of avoiding excessive dilution of the reaction gases, part of the reactants or inert gases are brought into the reaction zone at temperatures in excess of 2,000° C. and much higher, in which case extremely high temperatures occur in the centre of the plasma jet, due to a sharp rise of the temperature gradient towards the middle of the jet.

It has now been found that finely divided inorganic oxides can be produced by a process in which the corresponding halides are burnt and/or hydrolyzed at elevated temperatures in a mixing chamber. The process according to the invention is distinguished by the fact that the preheated reactants are introduced into the mixing chamber at a temperature between about 300 to below 2,000° C.

It has been found that products of greatly improved quality are obtained by avoiding local overheating of the finely divided oxides formed in the reaction zone.

In the process of invention the necessary heat supply can be provided either by electric energy or by additional chemical reaction, e.g. carbon monoxide combustion, whereby one or more of the reactants or an inert gas can be heated, the inert gas comprising in this case also recycled reaction gas.

The process according to the invention may be carried out either by avoiding preheating of the components above 2,000° C. to below this temperature limit, for example, by adding a relatively cold inert or reaction gas thereto. For example, the oxygen may be brought to average temperatures of from 1,200 to just below 2,000° C. by burning CO in the gas itself. Alternatively, oxygen or air enriched with oxygen may be heated to average temperatures below 2,000° C., i.e. to temperatures of between about 1,200 and just below 2,000° C., preferably by means of a high-voltage arc burner, for example by the process described in Belgian patent specification No. 678,283.

According to the invention this preheating by electric current (electric arc burners) may readily be carried out, for example, by allowing the total amount of oxygen and diluent gas, for example air, required for the reaction to pass through the burner at a suitable rate of flow in the form of a spiral vortex. In this case it is important that the enthalpy introduced by the electric current and the preheating of the halide required for the reaction be adjusted in such a way that a theoretical mixing temperature of from 800 to 1,200° C. is reached in the mixing and reaction zone.

The theoretical mixing temperature is the temperature which would be obtained by mixing all the gases flowing into the mixing and reaction zone provided that no reaction would occur. The theoretical mixing temperature can be calculated from the enthalpies of the gases which are mixed in the reaction zone. As however with the rapidly mixing of the gases spontaneous exothermic reaction occurs—the preheating of the components being necesesary only because of the high activation energy of the reaction and in order to compensate the radiation of heat—the actual reaction temperature is higher than the theoretical mixing temperature. The reaction temperature depends on the halide used or the oxide which is to be produced and the process conditions such as preheating of the components, gas velocities, dimensions and construction of the apparatus and son on. Generally, the reaction temperature will be in the range of from 900–1,600° C.; titanium dioxide being produced normally at temperatures of between about 1,200–1,500° C.

The hot gas stream leaving the electric arc burner in which zones differing substantially in temperature are present, has to be brought to a uniform level in a pre-mixing chamber. A cylindrical, conical, square or prismatic chamber into which the hot gas is axially, radially or tangentially introduced, may be used as the primary mixing chamber.

For the purposes of nucleation, a small quantity of the second reactant, i.e. the halide, may be introduced into the pre-mixing chamber where it reacts to form ultra-finely divided oxide which is then carried through to the reaction zone. However, the quantity in which the second reactant is used must be small enough to ensure that the required cooling effect is not compensated by the heat liberated during the exothermic reaction which preliminarily forms said ultra-finely divided oxide.

The pre-mixing chamber is followed by the mixing and reaction chamber. The cooling gases and reactants may be introduced into the individual pre-mixing chambers through annular slots or through circular or annular holes.

Graphite and hexagonal boron nitride have proved to be suitable lining materials for the pre-mixing chamber for non-oxidizing gases. By virtue of their outstanding resistance to high temperatures, these materials do not have to be cooled. The oxides: $ZrO_2$, $ThO_2$, BeO, CaO and, optionally, $Al_2O_3$ may be used for the oxidizing heat-transfer agents. If it is desired to use metals, they have to be cooled, resulting inevitably in heat losses.

FIGS. 1 to 6 show in longitudinal section and FIGS. 1a, 2a, 5a and 7–10 show correspondingly in cross-section various alternative forms for the pre-mixing and reaction chambers like parts, i.e. functionally equivalent parts are assigned. In each of these figures, like numerals 1 = insulation or cooling jacket,
2 = hot gas inlet,
3 = cold gas inlet,
4 = inlet for the reactant(s),
5 = pre-mixing zone, and
6 = mixing and reaction zone.

In the process according to the invention, a gas which is inert with respect to the reaction, e.g. $CO_2$, $N_2$, recycle gas, $Cl_2$ etc. and which simultaneously acts as a diluent, or an inert gas, e.g. $CO_2$, $N_2$, recycle gas, $Cl_2$ etc. in admixture with one of the reactants, for example, oxygen or halide, may also be preheated to extremely high temperatures, for example, in a range of from 2,000° C. to 2,500° C. in an electric arc, and then cooled to below 2,000° C. with recycle gas or another inert gas, e.g. $CO_2$, $N_2$, etc. in a pre-mixing zone or chamber directly beneath the burner outlet before it enters the reaction chamber. It may then pass into the mixing and reaction zone in which it is mixed with the other reactants in order to adjust the theoretical mixing temperature in the range of from 800° C. to 1,200° C.

Figure 1A:
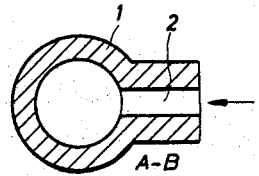
Figure 2:
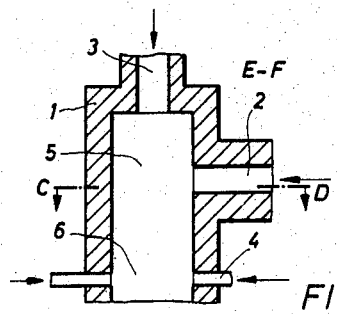
Figure 2A:
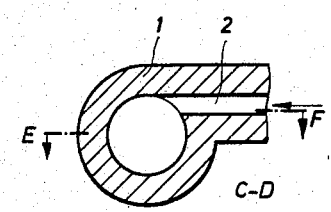
Figure 3:
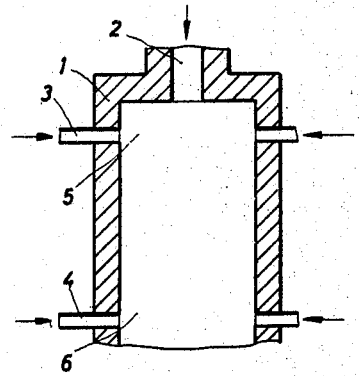

FIGS. 1 to 6 show possible forms for the pre-mixing chambers and the inlets through which the gases enter them, with FIGS. 1a, 2a and 5a taken along line A–B, C–D and G–H of FIGS. 1, 2 and 5, respectively, and FIG. 2 taken along line E–F of FIG. 2a, and with FIGS. 7–10 corresponding to FIG. 3.

It is of advantage to carry out cooling and mixing in the reaction chamber by radially or tangentially blowing the components into a mixing zone at an "impulse ratio" greater than 1 up to a ratio of 50.

The "impulse ratio" is the expression:

$$\frac{M_{Hal} \cdot V_{Hal}}{M_{O_2} \cdot V_{O_2}}$$

where $M_{Hal}$ = total amount of halide vapour, and
$M_{O_2}$ = total amount of the oxidizing gas, while $V_{Hal}$ and $V_{O_2}$ represent the corresponding rates of flow, calculated for actual temperatures. The impulse ratio is governed by the diameter of the mixer: for a small diameter, for example from 5 to 8 cm., the impulse ratio is around the lower limit specified, whilst, for a larger diameter, for example, from 10 to 30 cm., it is around the upper limit.

Apart from adjusting the reaction temperature, e.g. 900 to 1,600° C. which is basically known, another important factor is that optimum molar ratios should be adjusted between the reacting components, oxygen/halide. This ratio should be between 1 and 1.5. The dilution ratio is another important factor. The concentration in which the halide vapour is present in the reaction mixture should be between 25% and 45% by volume, calculated without reaction.

The process according to the invention is suitable for the production of fillers normally produced by steam hydrolysis, and for the production of pigments normally produced by combustion. Thus, it is possible by the process according to the invention to produce fillers and pigments from the halides including the chlorides, bromides, fluorides of Ti, Cr, Si, Al, Zr, Sn, Fe, Zn, and/or etc. and preferably from the chlorides: $TiCl_4$, $CrCl_3$, $CrO_2Cl_2$, $SiCl_4$, $AlCl_3$, $ZrCl_4$, $FeCl_2$, $ZnCl_2$ and $SrCl_4$ and so on or their mixtures. Broadly speaking, any metal chlorides which can be volatilized and which form solid metal oxides under the process conditions may be used.

In conventional systems, these chlorides firstly have to be volatilized and in cases where they are directly introduced in the mixing and reaction chamber the halides have to be preheated to the temperature required to reach in the reaction chamber the theoretical mixing temperature or the actual reaction temperature together with the enthalpy present in the other preheated components. If the oxygen is added directly into the reaction chamber the temperature to which the oxygen is preheated must also be adjusted accordingly. Generally, temperatures of between 300 and 800° C., preferably of between 400 and 600° C. are used.

In a preferred embodiment of the process of invention the oxygen is preheated to temperatures of below 2,000° C. preferably to 1,200–1,900° C. in a preheating chamber by burning carbon monoxide with excess oxygen. The hot gas mixture thereby obtained containing oxygen and carbon dioxide is then introduced parallel to the longitudinal axis of the mixing and reaction chamber whereas the halide is fed in with preheating temperatures of between 400 and 600° C. in cross-flow to the flow direction of the oxygen. The halide is preheated by means of heat exchange as known per se. In the mixing and reaction zone instantaneous mixing and reaction of the components occurs at the desired temperature level.

Due to the high gas velocity the metal oxides formed during the reaction is entrained rapidly out of the reaction zone together with the halogen formed. In the tube following the mixing and reaction zone the metal oxide suspended in the reaction gases is cooled to temperatures of between about 600 and 800° C. in order to avoid further particle growth.

The reaction mixture leaving the reactor is chilled, e.g. by the addition of water, and thereafter the metal oxide is separated from the reaction gases. The metal oxide is then aftertreated as known per se in the art, e.g. by removing the entrained halogen and/or hydrogen halogenide impurities and drying. Frequently, the metal oxides if to be used as pigments or fillers are aftertreated with inorganic or organic agents to improve their properties with regard to dispersibility, light stability and the like.

According to another preferred embodiment of the process of invention the oxygen either alone or together with an inert gas can be preheated in an electric arc burner, preferably a high voltage arc burner. In order to achieve a uniform temperature level the preheated gas is then introduced via a pre-mixing chamber into the reaction zone. In such cases where the oxygen or the oxygen inert gas mixture is preheated to temperatures of more than 2,000° C. relatively cold gas is admixed in the pre-mixing chamber in order to obtain a gas mixture having a temperature of at least just below 2,000° C., optionally of between 1,200–1,900° C. It is, however, also possible to preheat the inert gas alone by electric means and to admix the inert gas at the appropriate temperature level with the oxygen and halide in the reaction chamber. Furthermore, the preheated inert gas can be admixed with one of the reactants in the pre-mixing chamber prior to introducing the resultant mixture into the reaction zone.

Within the claimed scope of the invention other deviations and combinations of the aforedescribed embodiments of the process of invention are possible.

Gas discharge burners of any known type may be used in cases where the gases are electrically preheated, namely burner with high voltage arcs, that is to say arcs which run on a voltage of more than 1,000 v. and an arc resistance of less than 1 ohm and are stabilized by a tangential and/or magnetic or axial blast; and high-intensity arcs with voltages of less than 500 v., an arc resistance of less than 1 ohm and wall stabilization, and gas discharges produced by high-frequency operation without electrodes or with them, in which case an A.C. or D.C. voltage may be superimposed upon the induction discharge so that the gas is heated by resistance. The last of these processes has the advantage that the expensive high frequency is used only to ionize the gas, most of the energy being supplied by conventional 50 c./s. alternating current or by direct current.

As already mentioned, the use of arcs is limited to the high voltage arc in cases where the gas is only preheated to 1,500–2,000° C. before passing into the reaction chamber.

In cases where this process is used for the production of $TiO_2$ pigments from titanium chloride, conventional modifying agents and nucleants such as $AlCl_3$, $ZrCl_4$, $ThCl_4$, $CeCl_3$, $PCl_3$, $SbCl_3$, $SiCl_4$ and steam and/or potassium ions and solid nuclei are with advantage suitably added to one or both of the reaction gases.

Various types of preheating means and procedures, especially high voltage arc burner preheating, and inorganic halide oxidations to produce fillers, pigments, etc. are disclosed in copending U.S. applications which are incorporated herein by way of reference: Ser. No. 682,720, filed Oct. 31, 1967, which is a streamlined continuation of Ser. No. 361,357, filed Apr. 21, 1964; Ser. No. 536,728, filed Mar. 23, 1966; Ser. No. 686,247, filed Nov. 28, 1967; and Ser. No. 693,478, filed Dec. 26, 1967. The present invention is distinguished from these prior developments by the use of preheated reaction gases which are preheated to a temperature below 2,000° C. before they are admixed, thus achieving more efficiently a theoretical mixing temperature of about 800–1,200° C. and concomitantly a more uniform oxidation of the halide which avoids local overheating of the forming finely divided inorganic oxide product during the actual reaction.

It has been found in accordance with the present invention that solid particles with the desired properties, e.g. uniform particle size distribution, particle size, specific crystallinity and the like can be obtained only by avoiding overheating of the particles formed during the reaction. The quality of the solids depends substantially on the number of nuclei formed in a given time during the mixing and reaction zone as the particle size of the final product is highly influenced by the number of nuclei present during the reaction. The temperature in the reaction zone is one of the important features which influence the number of nuclei and the size and properties of the resultant metal oxide particles formed therefrom.

It is therefore necessary to avoid a non-uniform distribution of the nuclei in the reaction zone. In zones with different numbers of nuclei particles with different sizes are built up resulting in a product with a highly undesirable broad particle size distribution.

Although the reaction occurs in a time of less than one second it has been found necessary to keep the concentration as well as the temperature of the components in this very short time on a very constant level in order to obtain particles with the desired properties and small size distribution. It is not favourable therefore to mix a relatively cold reactant with a highly preheated second reactant to provide the necessary energy or by performing the reaction in the presence either of a CO— flame or an electric arc. The high temperatures occurring in such cases in the centre of the mixing zone or in the vicinity of the CO— or plasma flame would affect the particle properties in spite of the short time in which the reactants or the reaction products are exposed to such high temperatures exceeding substantially 2,000° C.

The following specific embodiments are given by way of example.

Example 1

38.5 $Nm.^3$/hour of oxygen, which had been heated at 2,250° C. in a high-voltage arc burner, were introduced at 2 into a mixing chamber of the kind shown in FIGURE 1. At the same time, 13.07 $Nm.^3$/hour of air at room temperature (20° C.) were introduced at 3, being mixed with the oxygen to form a uniformly heated gas mixture in pre-mixing zone 5 with an enthalpy of 17.55 kcal./mol corresponding to a temperature of 1,800° C. 1,675 mols/hour of gaseous $TiCl_4$ together with 33.5 mols/hour of gaseous $AlCl_3$, both gases having been heated to 500° C., were added via 4 to the gas mixture in the reaction zone thus yielding a theoretical mixing temperature of 913° C. The amount of components corresponds to a molar $O:TiCl_4$ ratio1:1.1, and to a $TiCl_4$-concentration of 40% by volume in the reaction zone.

A reaction temperature of 1,450° C. prevailed in the reaction zone. After chilling and separation, both carried out in known manner, 133 kg./hour of finely divided pure white $TiO_2$ were obtained. The product had a brightening power of 730 according to DIN and 1675 according to Reynolds, and a particle size of $0.19/\mu$. Its rutile content amounted to 98%.

Example 2

A mixture consisting of 32.5 $Nm.^3$ of $O_2$ and 14 $Nm.^3$ of $CO_2$ was introduced hourly at a temperature of 2,080° C. into the mixing chamber shown at FIGURE 2. At the same time 17.6 $Nm.^3$/hour of $N_2$ at 20° C. were blown in through the inlet 3, and mixed with the hot gas. The temperature of the resulting mixture was 1,660° C. 250 kg./hour of gaseous $TiCl_4$ super-heated to 450° C. and 5 kg./hour of gaseous $AlCl_3$ at the same temperature were introduced into this mixture through the inlets 4.

The mixture had a theoretical temperature of 995° C. and a molar $O:TiCl_4$-ratio of 1:1.1 and a $TiCl_4$-concentration of 31.5% by volume. Its $Al_2O_3$ content was 1.4% by weight adjusted to 1,360. The hot dispersion was cooled to 150° C. in a heat exchanger in known manner. The finely divided $TiO_2$ formed was then separated. After dilling and separation 110 kg./hour of finely divided pure white $TiO_2$ were obtained. It had a brightening power of 780 according to DIN and 1,700 according to Reynolds, and a particle size of $0.21/\mu$.

Example 3

Figure 4:
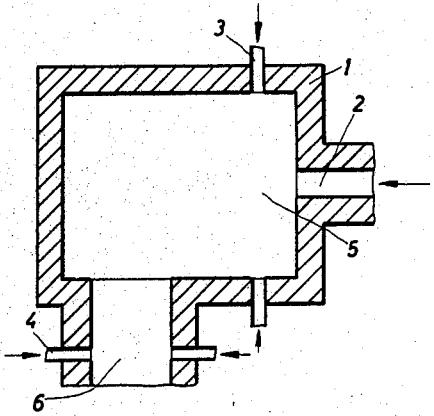

34.07 $Nm.^3$/hour of oxygen which had been heated to 2,000° C. in a high tension arc burner were introduced into the mixing chamber shown in FIGURE 4. The hot oxygen was blown in at 2. At the same time, 4.43 $Nm.^3$/hour of air at 20° C. were introduced at 3 and mixed with the hot oxygen at 5, producing a mixing temperature of 1,800° C.—221 kg./hour of gaseous $SiCl_4$ superheated to 400° C. were added at 4 to the hot gas mixture, in the reaction zone 6. The mixture with a molar $O_2:SiCl_4$-ratio of 1:1.17 and a $SiCl_4$-concentration of 43 percent by volume had a theoretical mixing temperature of 835° C. The reaction occurred at a temperature of around 1,500° C. and yielded 76 kg. per hour of a very loose, lightweight $SiO_2$ powder with a particle size of between 0.1 and $0.15/\mu$.

Example 4

In a high-voltage burner operated at 40 kw., a gas mixture of $Nm.^3$ $O_2$ and 20 $Nm.^3$ $N_2$ fed in hourly at 20° C. received an amount of energy of 10.8 kcal./mol, corresponding to an average temperature of 1,380° C.

It was introduced at 2 into a mixing chamber of the kind shown in FIGURE 2, and brought by vortex action to a uniform temperature level in the premixing zone of 1.325° C. 191 kg./hour of gaseous $AlCl_3$ at 350° C. were added to the gas at 4 in the reaction zone 6. The resultant mixture had a $AlCl_3$-concentration of 39% by volume with 25% oxygen in excess over the stoichiometric amount based on $AlCl_3$. A reaction temperature of 1.425° C. was obtained. 70.5 kg./hour of extremely loose $Al_2O_3$ with a powder density of 0.12 kg./l. and a particle size of $0.14/\mu$, were isolated from the hot waste gas in the following apparatus.

What is claimed is:

1. Process for the production of finely divided inorganic oxides which comprises introducing separately into a reaction zone the corresponding inorganic halide selected from the group consisting of the halides of Ti, Cr, Si, Zr, Fe, Al, Sn, Zn and mixtures thereof, at a preheating temperature substantially between about 400° C. to about 600° C. and an oxidant therefor selected from the group consisting of oxygen-containing gas, steam and mixtures thereof, at a preheating temperature substantially between about 1200° C. to about 1900° C., mixing said halide and oxidant in said zone in cross-flow under an impulse ratio of from more than 1 up to 50, said halide preheating temperature and said oxidant preheating temperature being selected with respect to each other so as to obtain upon said mixing a resultant gaseous mixture having a theoretical mixing temperature substantially between about 800–1200° C. without initiating reaction, and reacting such preheated and mixed halide and oxidant in said zone at an elevated temperature correspondingly above said theoretical mixing temperature and substantially between about 900 to about 1600° C. to form the corresponding finely divided inorganic oxide while avoiding in said zone local overheating of the finely divided oxide being formed 2. Process according to claim 1 wherein an inert gas is also introduced into said zone, at a preheating temperature substantially between about 1200° C. to about 1900° C.

3. Process according to claim 2 wherein at least one of said halide, oxidant and inert gas components is preheated to said preheating temperature in a high-voltage arc burner.

4. Process according to claim 2 wherein at least one of said halide, oxidant and inert gas components is preheated to said preheating temperature by an auxiliary exothermic chemical reaction.

5. Process according to claim 2 wherein at least one of said halide, oxidant and inert gas components is initially heated to a temperature above 2000° C. and thereafter cooled to said preheating temperature by addition of cold gas thereto before introduction into said zone.

6. Process according to claim 5 wherein the corresponding reaction gas is recovered from said zone and at least a part thereof cooled and recycled as cold gas by addition thereof to the initially heated component before introduction into said zone.

7. Process according to claim 1 wherein said halide is the corresponding chloride.

8. Process according to claim 1 wherein the molar ratio of oxygen in said oxidant to said halide is substantially between about 1–1.5:1 and the concentration of the halide in the reaction mixture is substantially between about 20–45% by volume.

References Cited

UNITED STATES PATENTS

| | | |
|---|---|---|
| 2,614,028 | 10/1952 | Schaumann. |
| 2,789,886 | 4/1957 | Kraus. |
| 3,275,412 | 9/1966 | Skrivan _____ 23—140 X |
| 3,275,411 | 9/1966 | Freeman et al. _____ 23—140 X |
| 3,306,760 | 2/1967 | Zirngibl et al. _____ 106—288 |

HERBERT T. CARTER, Primary Examiner

U.S. Cl. X.R.

23—21, 139, 140, 142, 145, 148, 182, 144, 200, 202